(12) United States Patent
Ran

(10) Patent No.: US 12,405,476 B2
(45) Date of Patent: Sep. 2, 2025

(54) HEAD-MOUNTED DEVICE SUPPORT AND HEAD-MOUNTED DEVICE

(71) Applicant: GUANGDONG OPPO MOBILE TELECOMMUNICATIONS CORP., LTD., Dongguan (CN)

(72) Inventor: Ke Ran, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 638 days.

(21) Appl. No.: 17/836,482

(22) Filed: Jun. 9, 2022

(65) Prior Publication Data

US 2022/0299782 A1    Sep. 22, 2022

Related U.S. Application Data

(63) Continuation of application No. PCT/CN2020/134597, filed on Dec. 8, 2020.

(30) Foreign Application Priority Data

Dec. 10, 2019   (CN) .......................... 201911261232.1
Dec. 10, 2019   (CN) .......................... 201922219163.X

(51) Int. Cl.
G02B 27/01    (2006.01)

(52) U.S. Cl.
CPC ................................ *G02B 27/0176* (2013.01)

(58) Field of Classification Search
None
See application file for complete search history.

(56) References Cited

U.S. PATENT DOCUMENTS

| 4,198,114 A | * | 4/1980 | Zapp | ................ | G02B 27/0176 |
| | | | | | 359/376 |
| 10,203,506 B1 | * | 2/2019 | Sullivan | ............ | G02B 27/0179 |

(Continued)

FOREIGN PATENT DOCUMENTS

| CN | 204088081 U | * | 1/2015 |
| CN | 105395314 A | | 3/2016 |

(Continued)

OTHER PUBLICATIONS

Extended European Search Report dated Dec. 9, 2022 received in European Patent Application No. EP20900509.9.

(Continued)

*Primary Examiner* — Ryan Crockett
(74) *Attorney, Agent, or Firm* — Sheppard, Mullin, Richter & Hampton LLP

(57) ABSTRACT

Provided are a head-mounted device support assembly and a head-mounted device. The head-mounted device support assembly includes a telescopic arm, a tightness adjustment mechanism, and a control module. The telescopic arm has an initial length. The tightness adjustment mechanism is connected to the telescopic arm for use in adjusting the telescopic length of the telescopic arm. The control module is electrically connected to the tightness adjustment mechanism, and controls the tightness adjustment mechanism based on an adjustment signal to drive the telescopic arm to move, so that the telescopic length is extended from the initial length or retracted to a target length. The head-mounted device support assembly can improve the wearing convenience.

17 Claims, 4 Drawing Sheets

(56) References Cited

U.S. PATENT DOCUMENTS

| | | | |
|---|---|---|---|
| 10,379,366 B1* | 8/2019 | Bristol | G02B 27/0176 |
| 10,444,517 B1* | 10/2019 | Drinkwater | G02B 27/0176 |
| 10,747,005 B1* | 8/2020 | Sullivan | G02B 27/0176 |
| 2018/0046147 A1* | 2/2018 | Aghara | G06F 3/012 |
| 2018/0055202 A1 | 3/2018 | Miller et al. | |
| 2018/0095497 A1* | 4/2018 | Hsu | A61F 9/06 |
| 2020/0375322 A1* | 12/2020 | Burks | A42B 7/00 |

FOREIGN PATENT DOCUMENTS

| | | | |
|---|---|---|---|
| CN | 107179609 A | | 9/2017 |
| CN | 206757190 U | | 12/2017 |
| CN | 108205202 A | * | 6/2018 |
| CN | 108205202 S | | 6/2018 |
| CN | 109407324 A | | 3/2019 |
| CN | 110228727 A | * | 9/2019 |
| CN | 111025637 A | | 4/2020 |
| CN | 211149075 U | | 7/2020 |
| WO | 2018174879 A1 | | 9/2018 |

OTHER PUBLICATIONS

International Search Report and Written Opinion dated Mar. 3, 2021 in International Application No. PCT/CN2020/134597. English translation attached.
The Grant Notice from corresponding Chinese Application No. 201922219163.X, dated Jun. 23, 2020. English translation attached.
Chinese First Office Action, Chinese Application No. 201911261232.1, mailed Dec. 21, 2024 (27 pages).
European Examination Report, European Application No. 20900509.9, mailed Dec. 11, 2024 (5 pages).

* cited by examiner

HEAD-MOUNTED DEVICE SUPPORT AND HEAD-MOUNTED DEVICE

CROSS-REFERENCE TO RELATED APPLICATIONS

The present application is a continuation of International Patent Application No. PCT/CN2020/134597, filed on Dec. 8, 2020, which claims priorities to Chinese Patent Application No. 201911261232.1 and Chinese Patent Application No. 201922219163.X, filed on Dec. 10, 2019. The entire disclosures of the aforementioned applications are incorporated herein by reference.

TECHNICAL FIELD

The present application relates to an electronic device, and particularly, relates to a head-mounted device support assembly and a head-mounted device.

BACKGROUND

Common head-mounted smart devices are fixed on the user's head through a strap in cooperation with a strap buckle, and the fabric of the strap buckle is tightened by a magic hook to increase the tightening force for fixing, or the fixing is implemented through a plastic headband gear locking mechanism cooperating with foam and PU. In this regard, the user has to manually adjust the strap every time when wearing the head-mounted device, which increases the complexity of wearing.

However, in the case of automatic shrinking wearing in an electric manner, it is required that the user knows of his or her head size for appropriate wearing and then inputs the corresponding command. Therefore, it may occur that the user must repeatedly adjust the wearing tightness until reaching a comfortable wearing effect, which obviously has still a high wearing complexity.

SUMMARY

The head-mounted device support assembly provided in the present disclosure can improve the convenience of wearing.

In order to solve the above-mentioned technical problems, the present disclosure adopts the following technical solutions.

According to an aspect of the present disclosure, the present disclosure provides a head-mounted device support assembly. The head-mounted device support assembly includes a telescopic arm having a first length, a tightness adjustment mechanism connected to the telescopic arm and configured to adjust a telescopic length of the telescopic arm, and a control module electrically connected to the tightness adjustment mechanism and configured to control, based on an adjustment signal from the tightness adjustment mechanism, the tightness adjustment mechanism to drive the telescopic arm to move, allowing the telescopic length to be extended or retracted to a target length from the first length.

According to another aspect of the present disclosure, the present disclosure provides a head-mounted device support assembly. The head-mounted device support assembly includes a telescopic arm, a tightness adjustment mechanism connected to the telescopic arm and configured to adjust a telescopic length of the telescopic arm, and a control module electrically connected to the tightness adjusting mechanism, and configured to control, based on an adjusting signal, the tightness adjusting mechanism to be in an adjusting state or a stopped state. The tightness adjusting mechanism is configured to, in the adjusting state, drive the telescopic arm to move to change a telescopic length, and the telescopic length of the telescopic arm is fixed when the tightness adjustment mechanism is in the stopped state.

According to another aspect of the present disclosure, the present disclosure provides a head-mounted device. The head-mounted device includes the head-mounted device support assembly as described above, and an imaging lens mounted on the head-mounted device support assembly.

Figure 1:
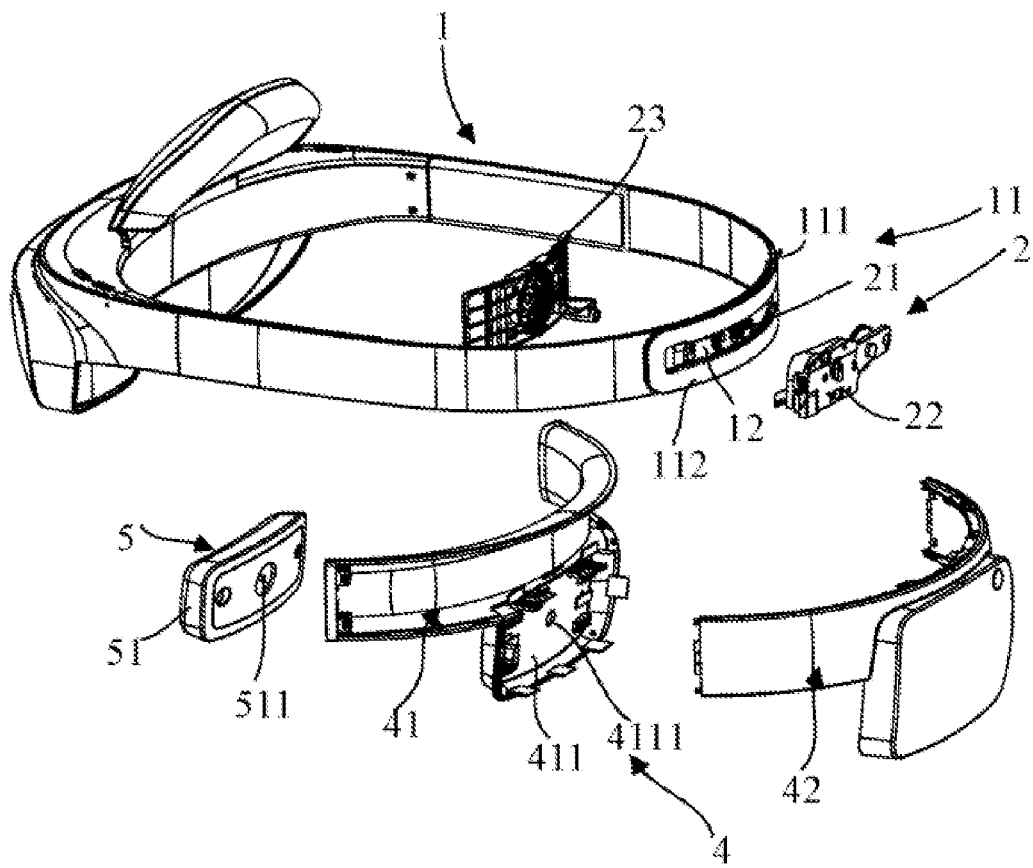
FIG. 1 is a structural exploded view of a head-mounted device according to an embodiment of the present disclosure.

REFERENCE NUMBERS 1 support body; 11 telescopic arm; 111 first telescopic arm; 112 second telescopic arm; 12 guide slot;
2 tightness adjusting mechanism; 21 adjusting gear; 22, drive assembly; 221 driving circuit; 23 gear support;
3 control module; 4 housing assembly; 41 front shell; 411 first power supply shell; 42 rear shell; 43 first switch; 431 first metal piece; 432 first elastic member;
5 force-receiving member; 51 elastic pad; 52 ejecting member; 521 support piece; 522 ejector pin; 511 mounting recess;
61 second metal piece; 62 second elastic member; 621 second elastic piece; 63 third metal piece; 64 third elastic member; 6211 first bending portion; 6212 second bending portion.

DESCRIPTION OF EMBODIMENTS

While the present disclosure may readily be embodied in different forms of embodiment, only some of the specific embodiments are illustrated in the drawings and will be described in detail in this specification. It is to be understood that this specification is to be regarded as the exemplary illustrations of principles of the present disclosure, but is not intended to limit the present disclosure to those described herein.

Accordingly, a reference to a feature in this specification is intended to describe one of the features of an embodiment of the present disclosure, rather than implying that each embodiment of the present disclosure must have the described feature. Furthermore, it should be noted that a number of features is described in the specification. Although certain features may be combined with one another to illustrate possible system designs, these features may also be used in other combinations not explicitly stated. Therefore, unless otherwise stated, the described combinations are not intended to limit the present disclosure.

In the embodiments illustrated in the drawings, directional indications (such as upper, lower, left, right, front and back), used to explain the structure and movement of various elements of the present disclosure, are absolute but rather relative. These indications are appropriate when the elements are in the positions as illustrated in the drawings. If the description of the positions of these elements changes, the indications of these directions change accordingly.

Exemplary embodiments will now be described thoroughly with reference to the accompanying drawings. These exemplary embodiments, however, can be embodied in various forms and should not be explained as being limited to the examples set forth herein. Instead, these exemplary embodiments are provided to describe the present disclosure thoroughly and completely, and will consolidate the concept of the exemplary embodiments. It will be fully conveyed to those skilled in the art. The drawings are merely schematic illustrations of the present disclosure and are not necessarily drawn to scale. The same reference numerals in the drawings denote the same or similar parts, and thus the repeated descriptions thereof will be omitted.

The preferred embodiments of the present disclosure will be further elaborated below with reference to the accompanying drawings of the present specification.

The head-mounted device of this embodiment includes a head-mounted device support assembly and an imaging lens. The imaging lens is mounted on a lens frame. The head-mounted device can be applied in various fields, for example, games, movies, education, military, medical, enterprise, e-commerce, etc., and the application field of the head-mounted device is not limited here. Moreover, the head-mounted device may be 3D glasses, virtual reality (VR) glasses, Augmented Reality (AR) glasses, etc.

Specifically, in this embodiment, the head-mounted device is described by taking AR glasses as an example, and details are not repeated in other embodiments.

The AR glasses allows a user to be able of seeing a scene combining virtual pictures with real life. The AR glasses can have many functions, and thus can be regarded as a miniature mobile phone, which, by tracking the eyeballs, can determine the current state of the user and initiate corresponding functions.

An imaging lens is used to image images of AR glasses. One or more imaging lenses may be provided. The number of imaging lenses may be designed according to different requires, and is not limited herein.

The present disclosure provides a head-mounted device support assembly, which includes a telescopic arm, a tightness adjustment mechanism, and a control module. The telescopic arm has a first length. The tightness adjustment mechanism is connected to the telescopic arm and is configured to adjust the telescopic length of the telescopic arm. The control module is electrically connected to the tightness adjustment mechanism and configured to control, based on an adjustment signal from the tightness adjustment mechanism, the tightness adjustment mechanism to drive the telescopic arm to move, allowing the telescopic length to be extended or retracted to a target length from the first length.

In an embodiment, the head mounted device support assembly includes a support body, and the support body may include a main body shell and a telescopic arm connected to the main body shell. There is one telescopic arm, and the tightness adjustment mechanism is disposed on the telescopic arm, or disposed at the joint between the telescopic arm and the main body shell. The tightness adjustment mechanism may include a winding assembly disposed therein to adjust the length of the telescopic arm by winding the telescopic arm.

In another embodiment, there are two telescopic arms, which will be described in detail below. FIG. 1 is a structural exploded view of the head-mounted device according to an embodiment of the present disclosure. Referring to FIG. 1, the support body 1 includes a lens frame and two telescopic arms 11 disposed on both sides of the lens frame. The two telescopic arms 11 are lap-jointed and overlapped with each other to make the support body 1 form a closed loop. The lengths of the two telescopic arms 11 are the same, and the overlapping position of the two telescopic arms 11 is located at a rear end of the support body 1, corresponding to the position of the back of the user's head. It can be understood that the overlapping position of the two telescopic arms 11 can also be located at other positions of the support body 1 by adjusting the lengths of the two telescopic arms 11, for example, the overlapping position of the two telescopic arms 11 can also correspond to the back of the user's ears, both sides of the forehead, etc.

The two telescopic arms 11 have each a lap jointing portion disposed are disposed on a corresponding free end thereof. The two lap-jointing portions are disposed to lap-joint and overlap with each other, allowing the main body 1 of the support to be in a closed ring shape. The two telescopic arms 11 move towards or away from each other, to adjust an overlapping length of the two lap jointing portions, so that a circumference of the support body 1 can be adapted to the wearing of different sizes of head shapes. It can be understood that the lap jointing portion may be located at one end of the telescopic arm 11 or at other positions such as the middle of the telescopic arm 11, and the position of the lap jointing portion is not limited herein. When the two telescopic arms 11 move towards each other, the overlapping length increases, and the circumference of the support body 1 is reduced to achieve the effect of tightening; and when the two telescopic arms 11 move away from each other, the overlapping length is reduced, and the circumference of the support body 1 is increased to achieve the effect of loosening.

Specifically, in this embodiment, the overlapping length between the two telescopic arms 11 is adjusted by the tightness adjustment mechanism 2. In an embodiment, the tightness adjustment mechanism 2 includes an adjusting gear 21 and a drive assembly 22. The adjusting gear 21 is located at an overlapping position of the two telescopic arms 11 and is engaged with the two telescopic arms 11. The drive assembly 22 is drivingly connected to the adjusting gear 21 and electrically connected to the control module 3. Specifically, the control module 3 sends out a control signal, so that the drive assembly 22 drives the adjustment gear 21 to rotate.

In an example, the two lap-jointing portions have each a guide slot 12 defined thereon, so that the two telescopic arms 11 can telescopically move with respect to each other along the guide slot 12. In addition, the guide slot 12 has teeth provided on an inner side wall thereof. The guide slot 12 is in a narrow and elongated opening slot in a rectangular shape. The teeth are disposed on the inner side wall of the guide slot 12 along a length direction, allowing the inner side wall of the guide slot 12 to form a rack-like structure. Specifically, for one telescopic arm 11, the teeth are disposed on one inner side wall of the guide slot 12, and for the other telescopic arm 11, the teeth are correspondingly disposed on another inner side wall of the guide slot 12. The teeth of one of the two guide slots 12 are opposite to the teeth of the other one, and the teeth are located on two opposite sides of the guide slots 12.

Further, the tightness adjustment mechanism 2 may further include a gear support 23, and the gear support 23 is fixedly disposed on one side of the lap jointing portions of the two telescopic arms 11. The gear support 23 has installation holes defined therein, and the gear support 23 is fixedly installed on the lap jointing portion of the telescopic arm 11 located at the inner side through the installation holes.

Specifically, in the present embodiment, the gear support 23 is disposed at an inner side of the support body 1, and the gear support 23 is disposed opposite to the guide slot 12. The gear support 23 corresponds to the position of the back of the user's head, and the outer surface of the gear support 23 is an arc surface adapted to the shape of the back of the head.

It can be understood that, in other embodiments, the guide slot 12 may be omitted. The two telescopic arms 11 may be disposed in a staggered way, and opposite sides of the two telescopic arms 11 are engaged with gears. Therefore, as long as the two telescopic arms 11 can mesh with the gear at the same time, the gear can be driven to rotate when the two telescopic arms 11 move relatively.

Figure 2:
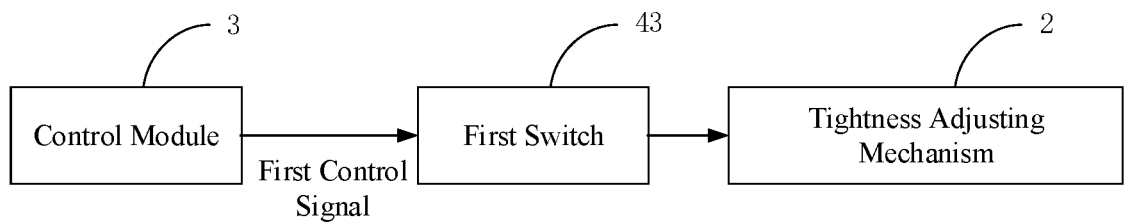
FIG. 2 is a circuit control block diagram of a head-mounted device according to an embodiment of the present disclosure.

FIG. 2 is a circuit control block diagram of a head-mounted device according to an embodiment of the present disclosure. Referring to FIG. 1 and FIG. 2, the drive assembly 22 is drivingly connected to the adjusting gear 21, and the drive assembly 22 drives the adjusting gear 21 to rotate, so as to adjust the overlapping length of the lap jointing portions of the two telescopic arms 11. In an embodiment, the drive assembly 22 may include a motor, a variator, and a drive board. The motor can be a stepper motor, an input end of the variator is connected to the output shaft of the stepper motor, and an output end gear of the variator is meshed with the adjusting gear 21. In this way, the adjusting gear 21 is driven by the motor to rotate to drive the first telescopic arm 111 and the second telescopic arm 112 to move towards or away from each other. A drive circuit 221 is disposed on the drive board, and the drive circuit 221 is configured to control the rotation of the motor through digital-to-analog conversion and amplification of the control signal transmitted by the control module 3.

In other embodiments, the drive assembly 22 may also be a pneumatic mechanism, which drive the adjusting gear 21 to rotate through an air cylinder, to drive the first telescopic arm 111 and the second telescopic arm 112 to move towards or away.

In an embodiment, the housing assembly 4 may include a housing and a first switch 43 disposed on the housing. The housing includes a front shell 41 and a rear shell 42. Both the front shell 41 and the rear shell 42 can be made of rigid material. The front shell 41 is disposed in the inner side of support body 1, that is, located on the side of the area enclosed by the support body 1. The front shell 41 is disposed in correspondence to the position of the lap jointing portion of the two telescopic arms 11. The rear shell 42 is disposed on the outside of the support body 1 and is engaged with the front shell 41. The housing assembly 4 can receive the two telescopic arms 11 and the tightness adjustment mechanism 2, and can also be configured to contain a battery of the head-mounted device.

The front shell 41 can be made of a rigid material, and it may include a first channel shell, and a first power supply shell 411 extending downward from the first channel shell. The rear shell 42 can be made of a rigid material, and it may include a second channel shell corresponding to the first channel shell, and a second power supply shell corresponding to the first power supply shell 411, and a battery is installed inside the second power supply shell. The second power supply shell and the battery installed therein can constitute a power supply assembly. The second channel shell and the second power supply shell are separated by a partition plate.

After the front shell 41 and the rear shell 42 are fastened together, the first channel shell and the second channel shell define a channel, into which the two telescopic arms 11 extend. After the first power supply shell matches with the second power supply shell, the space located above the partition plate can be defined as a first receiving compartment, and the space under the partition plate can be defined as a second receiving compartment. The first receiving compartment is in communication with the channel, and the first receiving compartment and the channel can be jointly defined as a first channel. In addition to receiving the overlapping lap-jointing portions of the two telescopic arms 11, the first receiving compartment may further receive the tightness adjustment mechanism 2, to adjust the overlapping length of the lap jointing portions of the two telescopic arms 11. Thus, the entity parts constituting the channel and the first receiving compartment can also be defined as a housing for the headband and the tightness adjustment mechanism 2 (also defined as a first housing). The second receiving compartment is used to receive the power supply, such as a battery, which can be defined as the power supply housing (also defined as a second housing).

Understandably, after the front shell 41 and the rear shell 42 are fastened together, the bodies of the first power supply shell 411, the second power supply shell and the first channel shell can be defined as the first housing; and the first channel shell and the second channel shell located on both sides of the first housing may be defined as the second housing.

In an example, the control module 3 has two signal output terminals, i.e., a V+ terminal and a V− terminal, which are configured to output motor control signals. The V+ terminal outputs a first signal to control a forward rotation of the motor, so that the two telescopic arms 11 move relative to each other to tighten the head-mounted device support assembly. The V− terminal outputs a second signal to allow the two telescopic arms 11 to move away from each other and loosen the head-mounted device support assembly.

In the present disclosure, the control module 3 may be a separate microcontroller unit (MCU), a single chip or a main control chip of the head-mounted device. The control module 3 can send out control signals to control the forward and reverse rotation of the motor. In the present disclosure, the control module 3 is electrically connected to the tightness adjustment mechanism to control the tightness adjustment mechanism 2 to drive the telescopic arms to move based on the adjustment signal from the tightness adjustment mechanism 2. In this way, the telescopic length is extended or retracted to a target length from the first length.

Here, the first length may be a fixed length, such as an initial length. It can also be a length set by the user.

The first length may also be an arbitrary length, and in this case, the first length is a nonfixed value.

The length of the telescopic arm 11 can be understood as the contributed length of the telescopic arm 11 in the ring formed by the telescopic arm 11 and the front shell. The first length of the telescopic arm 11 may be arbitrary. The target length of the telescopic arm 11 can be understood as the length of the telescopic arm that is adapted to the size of the user's head, which can be equal to the first length of the telescopic arm 11.

The control module 3 is configured to receive the adjustment signal. The adjusting signal can have at least three forms of sources.

In an embodiment, the support body 1 has a button disposed thereon, and the user can press the button to send the tightness adjustment mechanism 2 an adjustment signal of adjusting the size of the telescopic arm 111.

In another embodiment, the control module 3 has a memory unit and a detecting unit. The detecting unit is configured to confirm the identity of the user, and the memory unit can store the sizes of the users' head circumferences. Therefore, after the detecting unit confirm the identity of the user, the relevant information of the user can be retrieved to generate an adjustment signal. In this way, the length of the telescopic arm, which has been adjusted by the tightness adjustment mechanism, can exactly match the head size of the user. Here, the detecting unit may be a face recognition unit or a fingerprint recognition unit.

In another embodiment, the head-mounted device support assembly further includes a pressure sensor, which can be disposed on the housing assembly 4 or the telescopic arm 11. When the user wears the head-mounted device, the pressure sensor can directly or indirectly sense the pressure, and the pressure sensor is triggered to send a signal to the control module 3 when the pressure reaches a certain level, allowing the control circuit 3 to control the tightness adjustment mechanism to stop working.

In another embodiment, the head mounted device support assembly further include a first switch 43 and a force-receiving member 5. The first switch 43 is configured to connect or disconnect an electrical connection path between the control module 3 and the tightness adjustment mechanism 2. The force-receiving member 5 has a moving state and an initial state. When the force-receiving member 5 is in the moving state under an external force, the force-receiving member 5 can contact the first switch 43 to disconnect the electrical connection path, and the length of the telescopic arm is the target length. When the force-receiving member is in the initial state, there is a gap between the force-receiving member 5 and the first switch 45, and the electrical connection path is connected.

Figure 3:
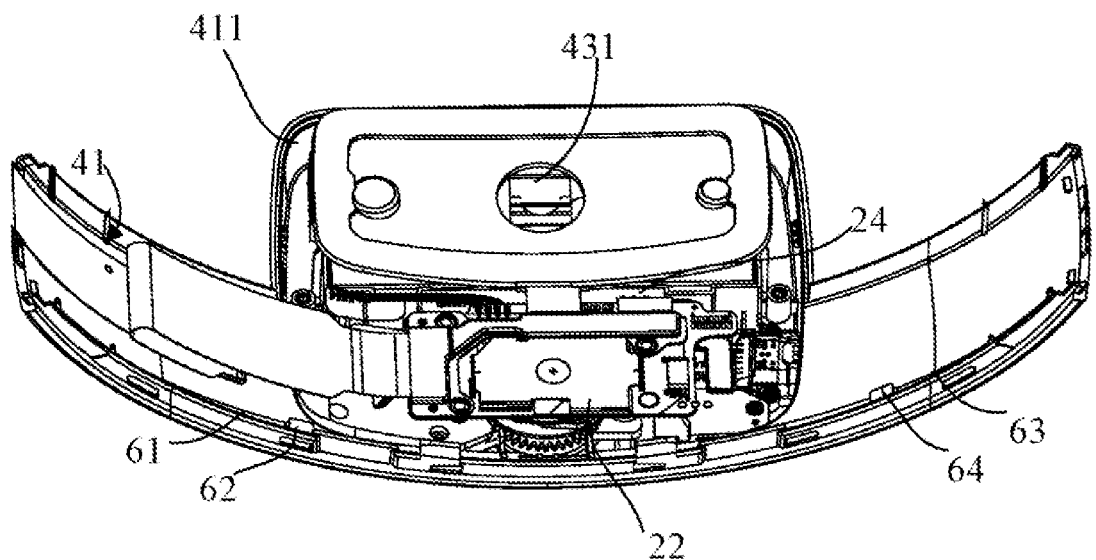
FIG. 3 is a structural schematic diagram of an assembly structure of a force-receiving member and a front shell in FIG. 1, in a certain perspective.
Figure 4:
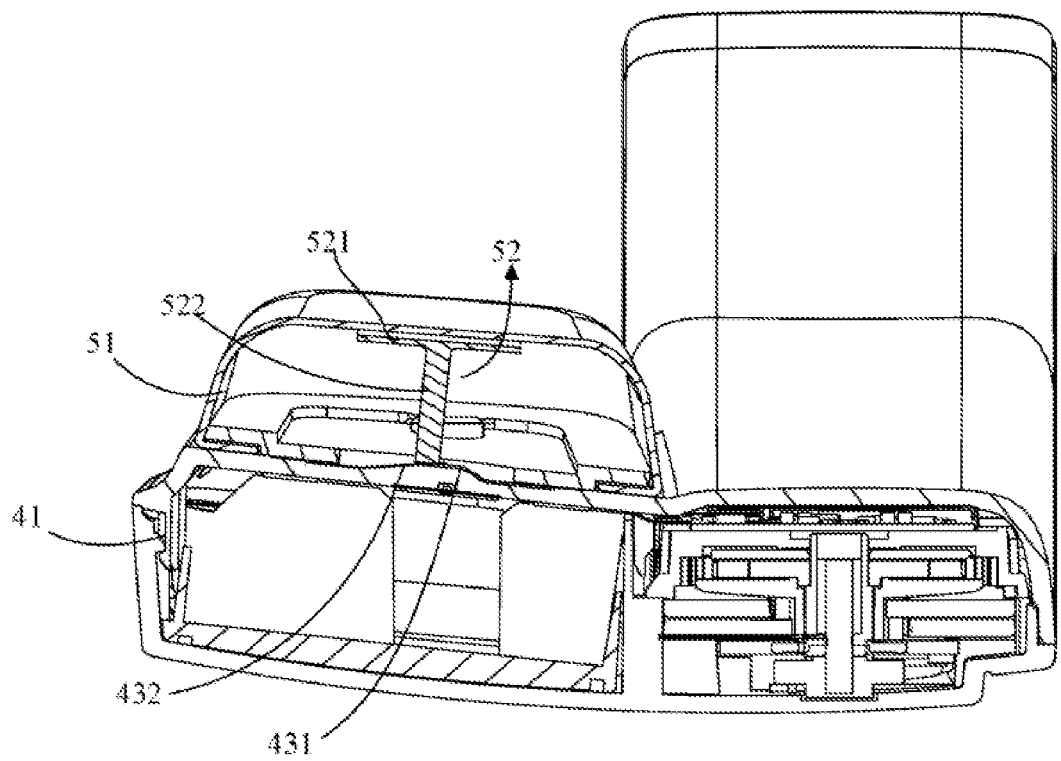
FIG. 4 is a cross-sectional view of the structure in FIG. 3.

Referring to FIG. 3 and FIG. 4, FIG. 3 is a structural schematic diagram of an assembly structure of a force-receiving member and a front shell in FIG. 1, in a certain perspective, and FIG. 4 is a cross-sectional view of the structure in FIG. 3. The first switch 43 may have various forms. In an embodiment, the first switch 43 includes a first metal piece 431 and a first elastic member 432 disposed on the housing. The first metal piece 431 and the first elastic member 432 are connected in series between the control module 3 and the tightness adjusting mechanism 2, and the first metal piece 431 is lap jointed with the first elastic member 432 to be electrically connected.

In an example, the first metal piece 431 is disposed on a front side of the power supply shell. The first metal piece 431 is substantially arc-shaped, with one end connected to the power supply shell, and the other end lap-jointed with the first elastic member 432. The first elastic piece 432 includes a first elastic piece. One end of the first elastic piece is connected to the power supply shell, and the other end is lap-jointed with an inner side of the first metal piece 431. The first elastic piece, due to the elastic force thereof, can be held against the inner side of the first metal piece 431 to implement an electrical connection therebetween.

For example, the V+ terminal of the control module 3 can be connected to the first elastic member 432 by means of cables or metal wire welding, and the first metal piece 431 is electrically connected to an input terminal of the driving circuit 221. Therefore, when the first elastic member 432 is electrically connected to the first metal piece 431, the first control signal output from the V+ terminal of the control module 3 can be transmitted to the driving circuit 221, to enable the motor to work normally. When the first elastic piece is detached from the first metal piece 431, the first control signal output from the V+ terminal of the control module 3 cannot be transmitted to the driving circuit 221, thus the motor stops working, and the two telescopic arms 11 stop moving relative to each other.

The force-receiving member 5 illustrated in FIG. 1 to FIG. 3 includes an elastic pad 51 and an ejecting member 52 disposed on the elastic pad 51. The force-receiving member 5 is connected to the housing assembly 4. The elastic pad 51 is provided to contact the user's head. The ejecting member 52 extends along a thickness direction of the elastic pad 51 and is disposed in correspondence to the first elastic member 432. When the elastic pad 51 is deformed to a certain extent under a pressure, the ejecting member 52 can push the first elastic member 432 away from the first metal piece 431, so as to cut off the transmission path of the first control signal.

In an example, the elastic pad 51 is a soft pad, which may correspond to the position of the back of the user's head. The force-receiving member 5 may further comprise a fixing plate, the soft pad is wrapped on the fixing plate, and a shape of the fixing plate matches the shape and size of the first power supply shell 411 of the front shell 41 of the housing assembly 4. The force-receiving member 5 can be fixed on the housing assembly 4 by means of buckle, or can be adhered to the housing assembly 4 by glue.

The ejecting member 52 is disposed inside the elastic pad 51. Specifically, in an embodiment, the soft pad has a leather cover, and a soft material, such as a sponge, filled in the leather cover. The elastic pad 51 has a mounting recess 511 defined thereon, the bottom of the mounting recess 511 can be the leather cover, and the mounting recess 511 has an opening facing towards the first elastic member 432. The bottom of the mounting recess 511 can be arc-shaped to match the shape of the soft pad.

The ejecting member 52 includes a support piece 521, and an ejector pin 522 disposed on the support piece 521. The support piece 521 is attached to the bottom of the mounting recess 511 to increase the contact area with the elastic pad 51. The ejector pin 522 extends in a direction towards the opening of the mounting recess 511.

Correspondingly, the front shell 41 has an escape hole 4111 defined therein, a position where the first elastic member 432 and the first metal piece 431 are lap jointed is located on one side of the escape hole 4111. When the first elastic member 432 is pushed by the ejecting member 52, the first elastic member 432 can move towards the escape hole 4111 to be separated from the first metal piece 431. In this way, the first metal piece 431 and the first elastic member 432 can be electrically disconnected.

When the user wears the head-mounted device, the support body 1 is continuously tightened as the tightness adjustment mechanism 2 controls the adjusting gear 21, and the elastic pad 51 will be gradually squeezed by the user's head and thus compressed in its thickness direction. It can be understood that, the greater the degree of tightening of the support body 1 is, the greater the degree of compression of the elastic pad 51 in the thickness direction will be. At the same time, when the elastic pad 51 is compressed in the thickness direction, the support piece 521 is displaced along the thickness direction of the elastic pad 51, so that the ejector pin 522 gradually moves in the direction towards the first elastic member 432. When the pressure on the user's head reaches a certain level, the user's wearing comfort is appropriate, and in this case, the ejector pin 522 can contact and push the first elastic member 432, allowing the first elastic member 432 to be separated from the first metal piece 431. In this way, the transmission path of the first control signal is cut off, such that the motor of the tightness adjusting mechanism 2 stops working, and the size of the support body 1 is maintained at the current position. Therefore, the present embodiments achieve the purpose of automatically adjusting the size of the support body 1 based on the wearing comfort.

It can be understood that a length of the ejector pin 522 can be designed based on the degree of compression of the soft pad in the thickness direction corresponding to the situation when the user feels comfortable wearing. Thus, when adjusting the size of the support body 1, the ejector pin 522 can just move to a position where it can push the first elastic member 432 to be separated from the first metal piece 431, once the degree of compression of the soft pad reaches a certain extent.

In the above embodiment, the elastic pad 51 is disposed on the front shell 41. In other embodiments, the elastic pad 51 can be directly connected to the support body 1 and located at the inner side of the support body 1 to contact the user's head.

The first switch 43, as described in the above embodiments, may be two metal pieces movably connected, the ejecting member 52 is an insulating piece, and the ejecting member 52 can extend between the two metal pieces to cut off an electrical connection of the two metal pieces. The first switch 43 can also be a switch circuit with a button, and the ejecting member 52 triggers the button to disconnect the switch circuit.

To sum up, in the present disclosure, the ejecting member 52 is disposed on the elastic pad 51, the first metal piece 431 and the first elastic member 432 are disposed on the housing assembly 4. During the wearing process, the overlapping size of the two telescopic arms 11 is automatically adjusted through the tightness adjustment mechanism 2. In addition, when the elastic pad 51 is pressed to a certain extent, the ejecting member 52 can push the first elastic member 432 away from the first metal piece 431 to cut off the transmission path of the first control signal. Thus, the elastic adjustment mechanism 2 stops working, and the size of the support body 1 is maintained at the current position. Therefore, the embodiments achieve the purpose of automatically adjusting the size of the support body 1 based on the wearing comfort, which improves the convenience of wearing.

During the process of automatically adjusting the size of the support body 1 by the tightness adjustment mechanism, when the support body 1 is tightened or loosened to a limit position, that is, when the two telescopic arms 11 move to the maximum or minimum size allowing the overlapping, no further adjustment is possible, if the motor of the tightness adjustment mechanism continues to rotate, the motor will be in a locked-rotor state and generate a large noise, or even the motor may be damaged.

In the following embodiments, it is to solve the problem that the locked-rotor of the motor appears when the support body 1 is tightened or loosened to the limit position.

In the present disclosure, the head-mounted device support assembly further comprises a second switch configured to connect or disconnect an electrical connection path between the control module and the tightness adjustment mechanism 2. The telescopic arm 11 has a retracting limit position. When a length of the telescopic arm 11 is at the retracting limit position, the electrical connection path between the control module 3 and the tightness adjusting mechanism 2 is disconnected by the second switch.

The second switch may have various structural forms, for example, it can be a single-pole double-throw switch. The second switch can be a piezoelectric switch. When the telescopic arm 11 has the retracting limit position, the piezoelectric switch can be triggered by pressing the piezoelectric switch, and the tightness adjusting mechanism 2 stops working in response to the output signal of the piezoelectric switch, so that the telescopic arm 11 can be maintained at the current length.

Figure 5:
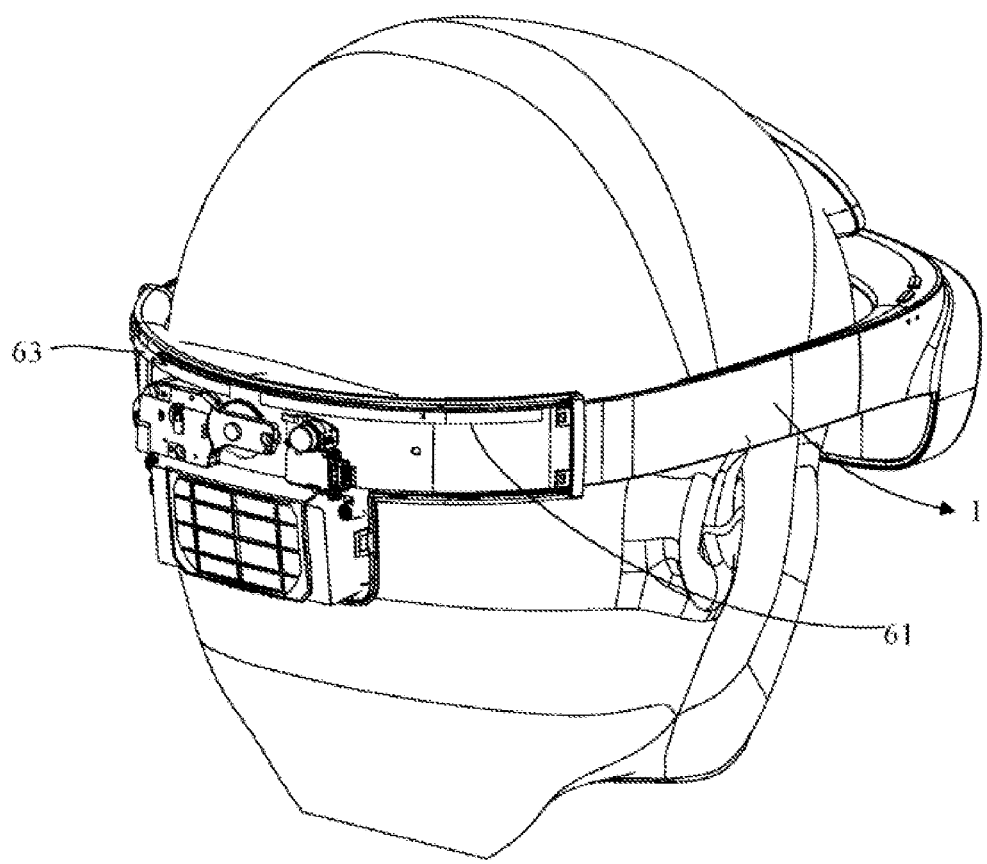
FIG. 5 is a diagram illustrating an in-use state of a head-mounted device in FIG. 1, where a rear shell is hidden.
Figure 6:
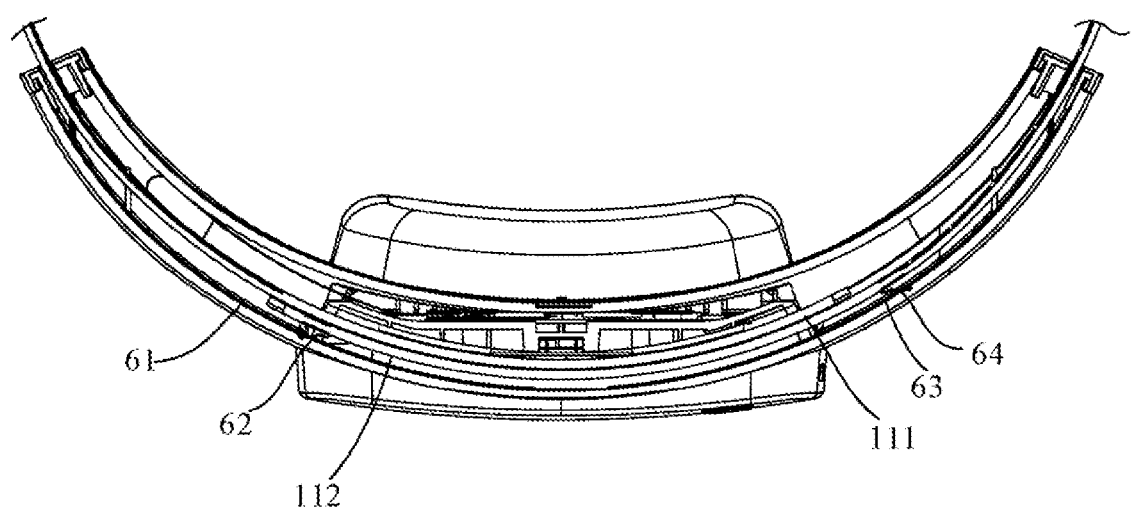
FIG. 6 is a cross-sectional view of a head-mounted device of the present disclosure along a thickness direction.

Referring to FIG. 5 and FIG. 6, FIG. 5 is a diagram illustrating an in-use state of a head-mounted device in FIG. 1, where a rear shell is hidden; and FIG. 6 is a cross-sectional view of a head-mounted device of the present disclosure along a thickness direction. Specifically, in an embodiment, the housing assembly 4 is further provided with a second metal piece 61, which extends correspondingly along the length direction of the telescopic arm 11. A second elastic member 62 is disposed on a side of the telescopic arm 11 facing towards the second metal piece 61. The second elastic member 62 and the second metal piece 61 are connected in series between the control module 3 and the tightness adjusting mechanism 2, and the second elastic member 62 is in contact with and electrically connected to the second metal piece 61. The second elastic member 62 can move to the outside of an end of the second metal piece 61 with the telescopic arm 11, to cutoff the transmission of the first control signal.

In an example, the second metal piece 61 is disposed on the rear shell 42 of the housing assembly 4. The second elastic member 62, in the shape of a strip, is disposed on one of the two telescopic arms 11 that is close to the rear shell 42. With reference to the orientation of the head-mounted device when it is normally worn, the second metal piece 61 can be disposed at a position close to an upper edge of the rear shell 42.

Herein, one of the two telescopic arms 11 close to the front shell 41 is referred to as the first telescopic arm 111, and the other one close to the rear shell 42 is referred to as the second telescopic arm 112. The second elastic member 62 is located between the rear shell 42 and the second telescopic arm 112. In addition, the second elastic member 62 is in contact with the second metal piece 61 under the action of its intrinsic elastic force to implement an electrical connection.

When the two telescopic arms 11 are retracted, the second elastic member 62 on the telescopic arm 11 close to the rear shell 42 is attached to and slides on the second metal piece 61, so that the first control signal sent by the control module 3 can be normally transmitted to the drive board of the tightness control mechanism. When the second elastic member 62 slides to the outside of the end of the second metal piece 61, the electrical connection between the second elastic member 62 and the second metal piece 61 is disconnected, and thus the first control signal sent by the control module 3 cannot be transmitted to the drive board of the tightness control mechanism, so as to stop the motor from working.

Here, the second elastic member 62 moves to a position at the end of the second metal piece 61, and the position corresponds to the maximum length position where the two telescopic arms 11 can overlap, that is, i.e., a tightening limit position of the support body 1. The position may also correspond to a position nearby the maximum length position where the two telescopic arms 11 can overlap, that is, a position close to the tightening limit position.

It can be seen that, in this embodiment, by providing the second elastic member 62 and the second metal piece 61, when the two telescopic arms 11 overlap each other over the maximum length, the motor cannot receive the first control signal and thus automatically stops working by disconnecting the electrical connection between the second elastic member 62 and the second metal piece 61. In this way, the occurrence of the locked-rotor is eliminated, thereby ensuring the working safety of the head-mounted electronic device and improving the user experience.

Embodiments of the second elastic member 62 will be described in the following examples.

Figure 8:
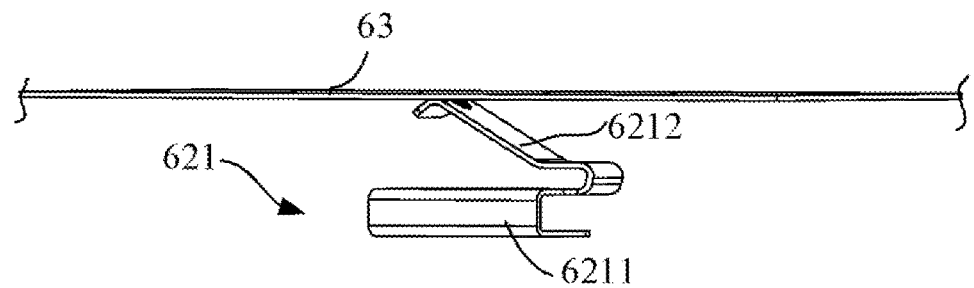
FIG. 8 is a structural schematic diagram of a second elastic member and a second metal piece according to an embodiment.

FIG. 8 is a structural schematic diagram of a second elastic member and a second metal piece according to an embodiment. Referring to FIG. 8, in an embodiment, the second elastic member 62 includes a second elastic piece 621, and the second elastic piece 621 includes a first bending portion 6211 and a second bending portion 6212 that are connected to each other. A side of the first bending portion 6211 facing away from the second bending portion 6212 is a connection plane, and the connection plane is connected to the surface of the telescopic arm 11. The second bending portion 6212 of the second elastic member 621 is provided to be contacted by the third metal piece 63.

In an example, the first bending portion 6211 is roughly U-shaped, and the second bending portion 6212, roughly in a hook-shape, is connected to one arm of the first bending portion 6211. The connection plane on the first bending portion 6211 can be in surface-to-surface contact with the telescopic arm 11 to improve the connection stability. Specifically, the connection plane can be connected to the telescopic arm 11 by means of bonding. In the present embodiment, the structure of the second elastic member 62 has better elastic force due to the two bending portions, ensuring a reliable contact with the second metal piece 61.

Figure 7:
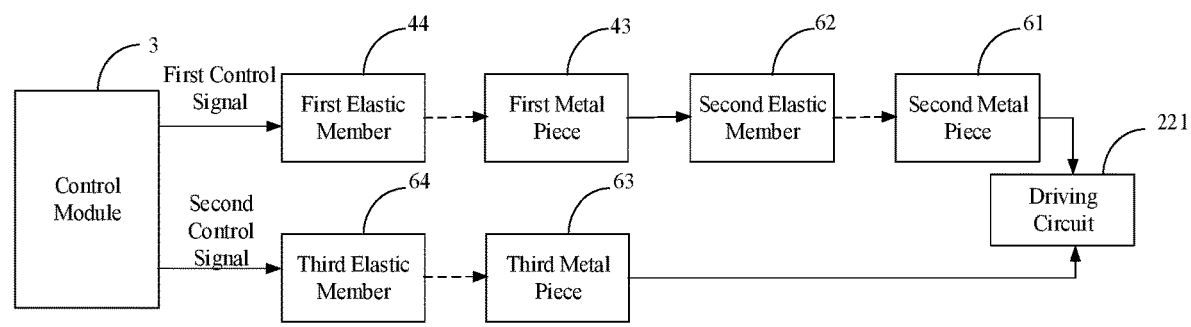
FIG. 7 is a circuit control block diagram of a head-mounted device according to another embodiment of the present disclosure.

FIG. 7 is a circuit control block diagram of a head-mounted device according to another embodiment of the present disclosure. Referring to FIG. 7, the first control signal output by the V+ terminal of the control module 3 can be electrically connected to the second elastic member 62, and the second metal piece 61 can be connected to the input terminal of the driving circuit 221. Alternatively, the first control signal output by the V+ terminal of the control module 3 can be electrically connected to the second metal piece 61, and the second elastic member 62 can be connected to the input terminal of the driving circuit 221. Therefore, when the second elastic member 62 is electrically connected to the second metal piece 61, the driving circuit 221 can receive the first control signal, allowing the motor to work normally.

The first elastic member 432, the first metal piece 431, the second elastic member 62, and the second metal piece 61 can be connected in series in the same circuit, as they are all used for transmitting the first control signal.

Figure 9:
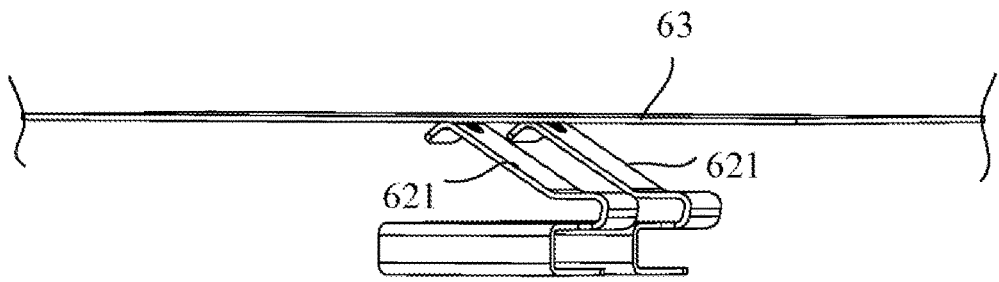
FIG. 9 is a structural schematic diagram of a second elastic member and a second metal piece according to another embodiment.

FIG. 9 is a structural schematic diagram of a second elastic member and a second metal piece according to another embodiment. Referring FIG. 9, in this embodiment, the second elastic member 62 includes two second elastic pieces 621 arranged side by side, one of the two second elastic pieces 621 is electrically connected to the control module 3, and the other one of the two second elastic pieces 621 is electrically connected to the driving circuit 221 of the tightness adjusting mechanism 2. The second bending portion 6212 of each second elastic piece 621 is connected to the second metal piece 61.

In this embodiment, the second metal piece 61 play a role in electrically connecting the two second elastic pieces 621. Similarly, when the second elastic member 62 slides out of the end position of the second metal piece 61, the second metal piece 61 cannot be electrically connected to the two second elastic pieces 621, and thus the electrical connection between the control module 3 and the driving circuit 221 of the elastic adjusting mechanism 2 is disconnected, so as to stop the motor from working.

Further, the head-mounted device support assembly further comprises a third switch, and the third switch is configured to connect or disconnect the electrical connection path between the control module and the tightness adjustment mechanism. The telescopic arm has a loosening limit position. When a length of the telescopic arm is at the loosening limit position, the electrical connection path between the control module and the tightness adjusting mechanism is disconnected by the third switch.

The third switch may have various structural forms, for example, it can be a single-pole double-throw switch. The third switch can also be a piezoelectric switch. When the telescopic arm 11 has the loosening limit position, the piezoelectric switch can be triggered by pressing the piezoelectric switch, and the tightness adjusting mechanism 2 stops working in response to the output signal of the piezoelectric switch, so that the telescopic arm 11 can be maintained at the current length.

In an example, the control module 3 sends the tightness adjusting mechanism 2 a second control signal for reducing the overlapping length of the two telescopic arms 11. The housing assembly 4 has a third metal piece 63 provided thereon, and the third metal piece 63 extends along the length direction of the telescopic arm 11. The telescopic arm 11 has a third elastic member 64 on a side facing towards the third metal piece 63. The third elastic member 64 and the third metal piece 63 are connected in series between the control module 3 and the tightness adjustment mechanism 2. The third elastic member 64 is in contact with and thus is electrically connected the third metal piece 63. The third elastic member 64 can move to the outside of the end of the third metal piece 63 along with the telescopic arm 11, so as to disconnect the transmission path of the second control signal.

In an example, the third metal piece 63 is disposed on the rear shell 42 of the housing assembly 4. The third elastic member 62, in the shape of a strip, is disposed on one of the two telescopic arms 11 that is close to the rear shell 42. With reference to the orientation of the head-mounted device when it is normally worn, the third metal piece 61 can be disposed at a position close to the upper edge of the rear shell 42.

Here, the third elastic member 64 moves to a position at the end of the third metal piece 61, and the position corresponds to the minimal length position where the two telescopic arms 11 can overlap, i.e., a loosening limit position of the support body 1. The position may also correspond to a position nearby the minimal length position where the two telescopic arms 11 can overlap, i.e., the position close to the loosening limit.

In an example, the second metal piece 61 and the third metal piece 63 are disposed in sequence along the extending direction of the telescopic arms 11, and an insulation gap is provided between the second metal piece 61 and the third metal piece 63. In another example, the first metal piece 431 and the second metal piece 61 are formed into one piece, and the first metal piece 431 and the second metal piece 61 can be isolated from one another by an insulating member.

When the two telescopic arms 11 move away from each other to loosen the support body 1, the third elastic member 64 located on the telescopic arm 11 close to the rear shell 42 is attached to and slides on the third metal piece 63, so that the second control signal sent by the control module 3 is normally transmitted to the drive board of the tightness control mechanism. When the third elastic member 64 slides to the outside of the end of the third metal piece 63, the electrical connection between the third elastic member 64 and the third metal piece 63 is disconnected, and thus the second control signal sent by the control module 3 cannot be transmitted to the drive board of the tightness control mechanism, so as to stop the motor from working.

It can be seen that, in the present embodiment, by providing the third elastic member 64 and the third metal piece 63, when the two telescopic arms 11 move relative to each other to the minimal length position of overlapping, the motor cannot receive the first control signal and thus automatically stops working. In this way, the occurrence of the locked-rotor is eliminated, thereby ensuring the work safety of the head-mounted electronic device and improving the user experience.

Embodiments of the third elastic member 64 will be described in the following examples.

In an embodiment, the third elastic member 64 includes a third elastic piece. The third elastic piece includes a first bending portion and a third bending portion that are connected to each other. A side of the first bending portion facing away from the third bending portion is a connection plane connected to a surface of the telescopic arm 11. The third bending portion of the third elastic piece is in contact with the third metal piece 63.

In an example, the first bending portion 6211 is substantially U-shaped, and the third bending portion is connected to one arm of the first bending portion 6211 and is substantially hook-shaped. The connection plane on the first bending portion 6211 can be in surface-to-surface contact with the telescopic arm 11 to improve the connection stability. Specifically, the connection plane can be connected to the telescopic arm 11 by means of bonding. In the present embodiment, the structure of the third elastic member 64 has better elastic force because of the two bending portions, ensuring a reliable contact with the third metal piece 63.

The second control signal output by the V+ terminal of the control module 3 can be electrically connected to the third elastic member 64, and the third metal piece 63 can be connected to the input terminal of the driving circuit 221. Alternatively, the first control signal output by the V+ terminal of the control module 3 can be electrically connected to the third metal piece 63, and the third elastic member 64 can be connected to the input terminal of the driving circuit 221. Therefore, when the third elastic member 64 is electrically connected to the third metal piece 63, the driving circuit 221 can receive the second control signal, so that the motor can work normally.

In another embodiment, the third elastic member 64 comprises two third elastic pieces arranged side by side, one of the two third elastic pieces is electrically connected to the control module 3, and the other one is electrically connected to the driving circuit 221 of the tightness adjusting mechanism 2. The third bending portion of each third elastic piece is connected to the third metal piece 63.

In this embodiment, the third metal piece 63 play a role in electrically connecting the third elastic pieces. Similarly, when the third elastic member 64 slides out of the end position of the third metal piece 63, the third metal piece 63 cannot be electrically connected to the two third elastic pieces, and thus the electrical connection between the control module 3 and the driving circuit 221 of the elastic adjusting mechanism 2 is disconnected.

To sum up, by providing the second elastic member 62 and the second metal piece 61 as well as the third elastic member 64 and the third metal piece 63, the elastic adjustment mechanism 2 is controlled to stop working based on the tightening-loosening size of the two telescopic arms 11, thereby automatically adjusting the wearing of the head-mounted device and improving the wearing convenience.

While the present disclosure is described with reference to several exemplary embodiments, it is to be understood that the terminology used is for the purpose of description and illustration, rather than limitation. The present disclosure can be embodied in many forms without departing from the spirit or spirit of the invention. It is to be understood that the above-described embodiments are not limited to any of the above-described details, but are to be construed broadly without departing from the spirit and scope defined by the appended claims. Therefore, all changes and modifications within the scope of the claims or their equivalents are defined by the appended claims.

What is claimed is:

1. A head-mounted device support assembly, comprising:
   a housing assembly, configured to accommodate a length-adjustable arm and a tightness adjustment mechanism; wherein the length-adjustable arm has an original length; a first switch is arranged on the housing assembly; wherein the tightness adjustment mechanism is connected to the length-adjustable arm and configured to adjust a length of the length-adjustable arm;
   a force-receiving member, detachably arranged on the housing assembly; and
   a control module, electrically connected to the tightness adjustment mechanism and configured to control, based on an adjustment signal from the tightness adjustment mechanism, the tightness adjustment mechanism to drive the length-adjustable arm to move, allowing the length to be increased or reduced to a target length from the original length;
   wherein the force-receiving member comprises an elastic pad, and an ejecting member disposed within the elastic pad; the ejecting member is disposed in correspondence to the first switch and extends along a thickness direction of the elastic pad;
   wherein the first switch comprises a first metal piece and a first elastic member, the elastic pad has a mounting recess defined therein, and an opening of the mounting recess faces the first elastic member;
   wherein the ejecting member comprises a support piece attached to a bottom of the mounting recess, and an ejector pin disposed on a surface of the support piece and extending in a direction towards the opening of the mounting recess;
   when the force-receiving member is in a moving state under an external force, the ejector pin is capable of contacting and pushing the first elastic member, allowing the first elastic member to be separated from the first metal piece, wherein an electrical connection path between the control module and the tightness adjustment mechanism is disconnected, and the length of the length-adjustable arm is the target length;

when the force-receiving member is in an initial state, there is a gap between the ejector pin and the first elastic member, and the electrical connection path is connected.

2. The head-mounted device support assembly according to claim 1, further comprising a front shell fixed on the length-adjustable arm and installed on an inner side of the length-adjustable arm, wherein the elastic pad is disposed on a side surface of the front shell facing away from the length-adjustable arm.

3. The head-mounted device support assembly according to claim 2, wherein the front shell has an escape hole at a position of the front shell corresponding to the opening of the mounting recess;

a lap-joint position of the first elastic member and the first metal piece is located on a side of the escape hole, and the ejecting member is capable of pushing the first elastic member to move towards the escape hole.

4. The head-mounted device support assembly according to claim 1, further comprising a second switch configured to connect or disconnect an electrical connection path between the control module and the tightness adjustment mechanism, wherein the length-adjustable arm has a retracting limit position, and when a length of the length-adjustable arm is at the retracting limit position, the electrical connection path between the control module and the tightness adjusting mechanism is disconnected by the second switch.

5. The head-mounted device support assembly according to claim 4, wherein the second switch comprises:

a second metal piece extending along a length direction of the length-adjustable arm; and a second elastic member disposed on a side of the length-adjustable arm facing towards the second metal piece, wherein the second elastic member and the second metal piece are connected in series between the control module and the tightness adjusting mechanism, and the second elastic member is in contact with and electrically connected to the second metal piece, and the second elastic member is capable of moving to an outside of an end of the second metal piece along with the length-adjustable arm, to disconnect the electrical connection path between the control module and the tightness adjusting mechanism.

6. The head-mounted device support assembly according to claim 5, further comprising a rear shell disposed on an outer side of the length-adjustable arm, wherein the second metal piece is disposed on the rear shell, and the second elastic member is disposed on one of two length-adjustable arms closer to the rear shell.

7. The head-mounted device support assembly according to claim 5, wherein the second elastic member comprises a second elastic piece; the second elastic piece comprises a first bending portion and a second bending portion that are connected to each other; a side of the first bending portion facing away from the second bending portion is a connection plane connected to a surface of the length-adjustable arm; and the second bending portion of the second elastic piece is configured to be in contact with the second metal piece.

8. The head-mounted device support assembly according to claim 5, wherein the second elastic member comprises two second elastic pieces arranged side by side; one of the two second elastic pieces is electrically connected to the control module, and the other one of the two second elastic pieces is electrically connected to the tightness adjusting mechanism; and a second bending portion of each of the two second elastic pieces is connected to the second metal piece.

9. The head-mounted device support assembly according to claim 1, further comprising a third switch configured to connect or disconnect an electrical connection path between the control module and the tightness adjustment mechanism, wherein the length-adjustable arm has a loosening limit position, and when a length of the length-adjustable arm is at the loosening limit position, the electrical connection path between the control module and the tightness adjusting mechanism is disconnected by the third switch.

10. The head-mounted device support assembly according to claim 9, wherein the third switch comprises:

a third metal piece extending along a length direction of the length-adjustable arm; and a third elastic member disposed on a side of the length-adjustable arm facing towards the third metal piece, wherein the third elastic member and the third metal pieces are connected in series between the control module and the tightness adjusting mechanism, and the third elastic member is in contact with and electrically connected to the third metal piece, and wherein the third elastic member is capable of moving to an outside of an end of the third metal piece along with the length-adjustable arm, to disconnect the electrical connection path between the control module and the tightness adjusting mechanism.

11. The head-mounted device support assembly according to claim 10, further comprising:

a front shell fixed on the length-adjustable arm and installed on an inner side of the length-adjustable arm; and a rear shell disposed on an outer side of the length-adjustable arm and engaging with the front shell, wherein the third metal piece is disposed on the rear shell, and the third elastic member is disposed on one of two length-adjustable arms closer to the rear shell.

12. The head-mounted device support assembly according to claim 10, wherein the third elastic member comprises a third elastic piece; the third elastic piece comprises a first bending portion and a second bending portion that are connected to each other; a side of the first bending portion facing away from the second bending portion is a connection plane connected to a surface of the length-adjustable arm; and the second bending portion of the third elastic piece is configured to be in contact with the third metal piece.

13. The head-mounted device support assembly according to claim 10, wherein the third elastic member comprises two third elastic pieces arranged side by side; one of the two third elastic pieces is electrically connected to the control module, and the other one of the two third elastic pieces is electrically connected to the tightness adjusting mechanism; and a second bending portion of each of the two third elastic pieces is connected to the third metal piece.

14. The head-mounted device support assembly according to claim 1, wherein two length-adjustable arms are provided, and free ends of the two length-adjustable arms are partially overlapped.

15. The head-mounted device support assembly according to claim 14, wherein the tightness adjustment mechanism comprises:

an adjustment gear located at an overlapping position of the two length-adjustable arms and engaging with the two length-adjustable arms; and a drive assembly drivingly connected to the adjustment gear and electrically connected to the control module, wherein the drive assembly is configured to drive the adjustment gear to rotate to adjust an overlapping length of the two length-adjustable arms.

16. The head-mounted device support assembly according to claim 15, wherein the two length-adjustable arms have each a guide slot defined therein, the adjustment gear is received in and engaged with the guide slot, and the adjustment gear is capable of rotating along the guide slot in response to the two length-adjustable arms moving towards or away from each other.

17. The head-mounted device support assembly according to claim 1, wherein the control module is further configured to control, based on the adjustment signal, the tightness adjusting mechanism to be in an adjusting state or a stopped state, wherein the tightness adjusting mechanism is configured to, in the adjusting state, drive the length-adjustable arm to move to change the length of the length-adjustable arm, and the length of the length-adjustable arm is fixed when the tightness adjustment mechanism is in the stopped state.

\* \* \* \* \*